US005849248A

United States Patent [19]

Homberg

[11] Patent Number: 5,849,248

[45] Date of Patent: Dec. 15, 1998

[54] ADJUSTABLE VOLUME PIPETTE WITH IMPROVED VOLUME ADJUSTMENT LOCK MECHANISM

[75] Inventor: William D. Homberg, Oakland, Calif.

[73] Assignee: Rainin Instrument Co., Inc., Emeryville, Calif.

[21] Appl. No.: 611,074

[22] Filed: Mar. 5, 1996

[51] Int. Cl.[6] ................................ G01N 1/14; B01L 3/02

[52] U.S. Cl. .................. 422/100; 73/864.13; 73/864.16; 73/864.18; 422/103

[58] Field of Search ............................ 422/100, 101–104; 73/864.16, 864.18, 864.13; 436/180; 222/287, 309, 321

[56] References Cited

U.S. PATENT DOCUMENTS

| | | | |
|---|---|---|---|
| Re. 32,210 | 7/1986 | D'Autry | 73/864.14 |
| 3,827,305 | 8/1974 | Gilson et al. | 73/425.6 |
| 4,141,250 | 2/1979 | D'Autry | 73/425.6 |
| 4,284,604 | 8/1981 | Tervamaki | 422/100 |
| 4,406,170 | 9/1983 | Kuhn | 73/864.16 |
| 4,909,991 | 3/1990 | Oshikubo | 422/100 |
| 5,012,682 | 5/1991 | Sabloewski | 73/864.18 |
| 5,018,394 | 5/1991 | Gilson | 73/864.18 |
| 5,104,624 | 4/1992 | Labriola | 422/100 |
| 5,320,810 | 6/1994 | Al-Mahareeq et al. | 422/100 |
| 5,330,721 | 7/1994 | Tervamaki | 422/100 |

*Primary Examiner*—Harold Y. Pyon
*Attorney, Agent, or Firm*—Robert R. Meads

[57] ABSTRACT

A volume adjustable pipette for aspirating and dispensing precise volumes of liquid comprising an elongated hollow hand-holdable housing supporting a plunger for turning and for axial movement within the housing the pipette including (i) an upper stop which is axially adjustable within the housing in response to a turning of the plunger to adjust the volume of liquid which may be drawn into a tip secured to a lower end of the housing upon upward axial movement of the plunger to the upper stop and (ii) a manually actuated lock mechanism for locking the plunger against rotation to set the volume adjustment for the pipette and comprising a hand-turnable knob for actuating and releasing the lock mechanism by virtue of two thumb and/or finger engageable wings extending outwardly from diametrically opposite sides of the hand-turnable knob a gripping member for fixedly securing the plunger against turning and being actuated by a turning of the hand-turnable knob to force a cam surface of the knob against a cam surface of the gripping member.

4 Claims, 2 Drawing Sheets

ADJUSTABLE VOLUME PIPETTE WITH IMPROVED VOLUME ADJUSTMENT LOCK MECHANISM

BACKGROUND

The present invention relates to volume adjustable manual pipettes and, more particularly, to an improved manual pipette including a volume adjustment lock mechanism.

U.S. Pat. No. 4,909,991 describes a commercially available single channel manual pipette manufactured by Nichiryo Co. Ltd., Tokyo, Japan. As shown in FIG. 1 herein, the Nichiryo pipette includes an elongated hand-holdable housing 1 for an upwardly spring biased plunger 25. An upper end of the plunger 25 extends above a top of the housing 1 and carries a control knob 26 for thumb and finger engagement in manually turning the plunger and for axially moving the plunger in the pipette housing between an upper stop and a lower stop at which all liquid within a tip 1*a* secured to a lower end of the housing is expelled by the downward movement of the plunger. The upper stop is axially adjustable within the housing in response to a turning of a hollow volume adjustment screw or shaft 9 keyed to the plunger 25 (See FIG. 2). The axial adjustment of the upper stop adjusts the volume of liquid which the pipette is capable of drawing into the tip in response to upward movement of the plunger to the upper stop. The pipette also includes a lock mechanism (21 in FIG. 2) including a lock knob 24 for locking the plunger 25 against rotation to thereby set the upper stop in a fixed position and hence set the volume adjustment for the pipette.

Thus, in use, an operator first grasps the pipette housing in one hand and with the thumb and forefinger of the other hand grips the control knob 26 and turns the plunger 25 to adjust the volume setting for the pipette. In this regard, a turning of the plunger 25 produces axial movement of the upper stop and the volume setting for the plunger is changed and indicated on a micrometer display within the pipette housing. Once the desired volume setting is displayed, the operator actuates the lock mechanism 21 to secure the plunger 25 against rotation and to set the volume adjustment for the pipette.

Then, the operator grips the pipette housing 1 in one hand with his or her thumb over the top of the control knob 26. Downward thumb action on the control knob 26 moves the plunger 25 downward from the upper stop against the upward bias of a return spring to the lower stop at which all liquid is expelled from the tip 1*a* secured to the pipette. To then aspirate or draw the desired volume of liquid into the tip, the operator places an end of the tip in a sample liquid and releases the control knob to allow the return spring to return the plunger to the upper stop. Finally, to dispense the desired volume of liquid sample, the operator moves the tip of the pipette to a receptacle for receiving the sample and depresses the control knob with his or her thumb to move the plunger from the upper stop to the lower stop.

When it is desired to again adjust the volume setting for the pipette, the operator again grasps the pipette housing 1 in one hand, and with the other hand manually turns the lock knob 24 to release the lock mechanism 21 allowing a turning of the plunger 25 to effect axial movement of the upper stop to a desired new position establishing a new volume for the pipette which is displayed by the micrometer. The operator then turns the lock knob 24 in an opposite direction to secure the lock mechanism 21 and lock the plunger 25 against rotation to set the new volume for the pipette.

Unfortunately, in practice, the lock mechanism described in U.S. Pat. No. 4,909,991 requires the operator to exert a considerable turning force with one hand while holding the pipette housing firmly with another hand to effect a manual actuation and release of the lock mechanism. In an attempt to render the locking mechanism more easily actuated and as shown in FIG. 3 herein, Nichiryo has recently added a thumb engageable wing 24*a* to extend outwardly from the lock knob 24. This enables an operator to exert thumb pressure on one side of the wing 24*a* to turn the knob in one direction and effect an actuation of the lock mechanism. Then by reaching around the end of the wing 24*a* with the thumb and by pulling back on the wing the operator is able to turn the lock knob 24 in an opposite direction to effect the release of the lock mechanism. Unfortunately, such manual operation of the lock knob is awkward and still requires the exertion of a considerable force by the operator.

Further, in practice, the internal structure of the lock mechanism 21 of U.S. Pat. No. 4,909,991 allows slightly different volumes of liquid to be aspirated and dispensed by the pipette for any given volume setting for the pipette. Specifically, as shown in FIG. 2 herein, the lock mechanism 21 consists of a housing 22 which is rigidly secured in an upper end portion of the pipette housing 1. A snap ring or washer 23 is located on a bottom of the housing 22 while the knob lock 24 is screwed into the housing 22 as shown. The washer 23 has an inner peripheral projection 23*a* that is engaged with a keyway 9*a* of the hollow shaft 9 so that the washer 23 is capable of rotating together with the shaft 9 as one unit. Normally, however, the washer 23 is pressed by the end of the lock knob 24 so as to be secured to the bottom of the housing 22. Accordingly, it is intended in the Nichiryo pipette that the hollow shaft 9, which is secured to the housing 1 through the washer 23 normally be prevented from rotating. In fact, it is intended that the hollow shaft 9 only be allowed to rotate when the volumetric capacity of the pipette is to be varied by unscrewing the lock knob 24 to permit a manual turning of the plunger 25.

In actual construction, however, the projection 23*a* is smaller in lateral dimension than the keyway 9*a*. Thus, there is a clearance between the projection 23*a* and the sides of the keyway 9*a*. Because of the clearance, even though the lock mechanism 21 is actuated with the micrometer displaying a given volume, the plunger 25 and hollow shaft 9 are still turnable relative to the fixed projection 23*a* until the projection bears against one side of the keyway or the other. Accordingly, during actual operation of the Nichiryo pipette it is possible for an operator to inadvertently turn the plunger 25 and aspirate slightly different volumes of liquid into the pipette tip. Such volume variations preclude accurate repeatability, of pipetting operations.

Accordingly, there is a need for an improved adjustable volume pipette which is more easily locked against and released for volume adjustment and which when locked sets the volume capacity of the pipette at a single non-variable volume thereby insuring accurate repeatability of pipetting operations. In particular, it is desired that the pipette accommodate such locking, unlocking and volume setting with the same hand with which a user holds the pipette, thereby leaving the user's other hand free to perform other tasks. The present invention satisfies such needs.

SUMMARY OF INVENTION

Basically, the present invention overcomes the foregoing problems by providing a volume adjustable pipette for aspirating and dispensing precise volumes of liquid comprising an elongated hollow hand-holdable housing containing a plunger supported for turning and for axial movement within the housing. An upper end portion of the plunger extends from a top of the housing for thumb and finger engagement by a user of the pipette. In addition to the plunger, the housing contains an axially adjustable upper stop for the plunger. A turning of the plunger adjusts the axial location of the upper stop and hence adjusts the volume of liquid which may be drawn into a tip of pipette upon upward movement of the plunger from a lower position to the upper stop. Further, the pipette comprises a lock mechanism comprising a manually turnable lock knob for locking the plunger against rotation to set the volume adjustment for the pipette. Preferably, the lock mechanism comprises two thumb or finger engageable wings extending outwardly from diametrically opposite sides of an exposed upper end portion of the lock knob to effect actuation of the lock mechanism upon a thumb and/or finger movement of one of the wings in a first direction and for effecting a release of the lock mechanism upon a thumb and/or finger movement of the other of the wings in a second or opposite direction. In this manner, the present invention provides for easy thumb and/or finger actuated locking and unlocking of the lock mechanism.

To ensure accurate repeatability of pipetting operations the lock mechanism of the present invention preferably comprises a collet supported inside the pipette housing to engage, tightly grip and lock against an outer peripheral surface of a hollow shaft or volume screw which is otherwise turnable with the plunger to effect volume adjustments. The collet is actuated to lock the volume screw and plunger against rotation by a turning of the lock knob in one direction to move a cam surface on the lock knob into mating relationship with a sloping outer surface of the collet. This causes the collet to tightly press and lock against the outer surface of the volume screw. To effect a release of the collet from the outer surface of the volume screw the lock knob simply is turned in an opposite direction. Since the collet tightly grips volume screw without any rotational clearance, there is no undesired “play” associated with the lock mechanism of the present invention. Thus, when the lock mechanism is actuated, the volume capacity of the pipette is set and will not vary during pipette operation until it is desired to reset the volume capacity for the pipette. Thus, with the lock mechanism of the present invention actuated, the operation of the pipette will be repeatable from one operation to the next.

DETAILED DESCRIPTION OF INVENTION

Figure 5:
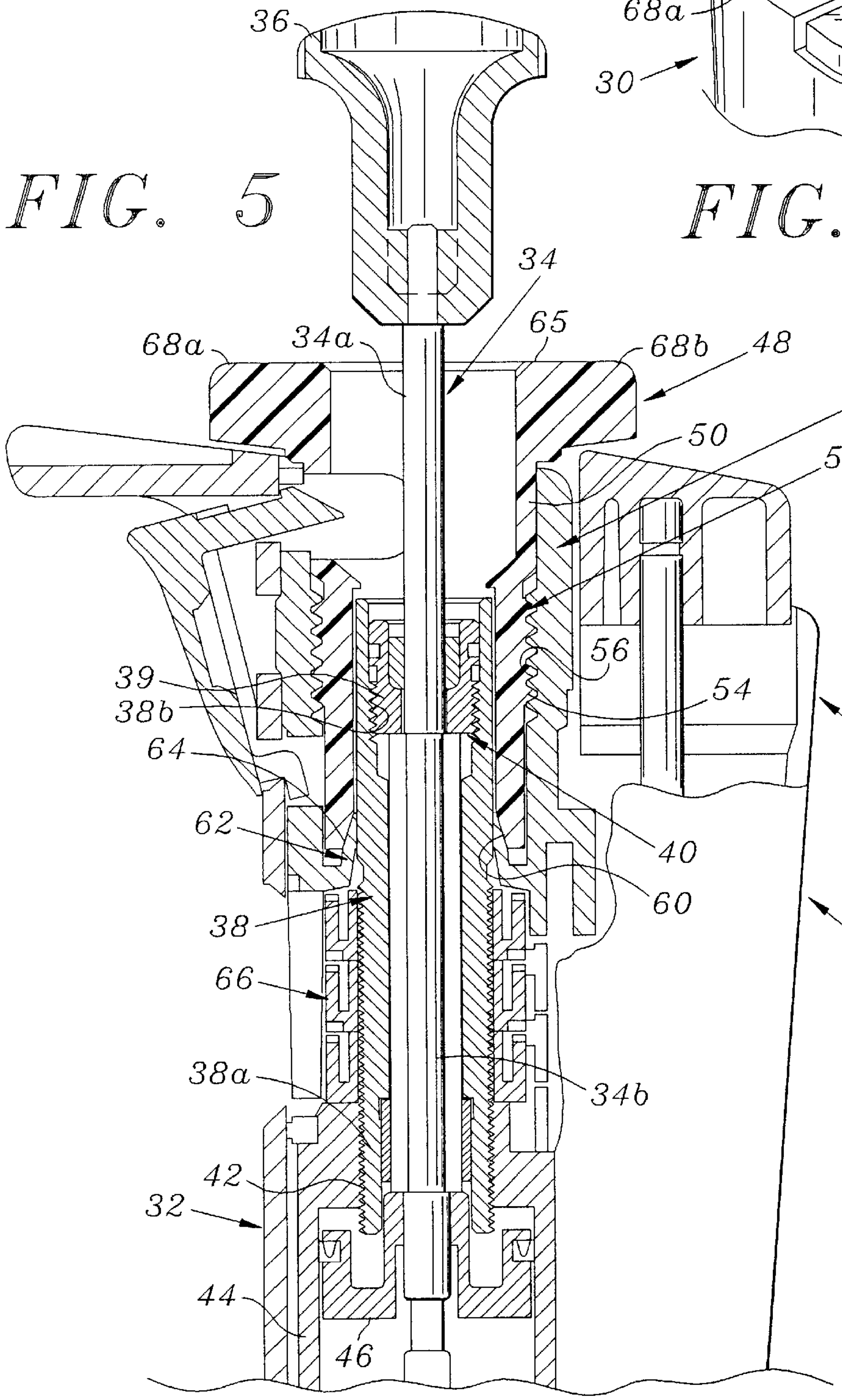
FIG. 5 is a fragmentary side view partially in section of an upper portion of the improved pipette of the present invention illustrating a preferred embodiment of the improved lock mechanism including a pair of wings extending from diametrically opposite exposed sides of a knob lock as shown in FIG. 4.

Referring specifically to FIG. 5, the volume adjustable pipette of the present invention is designated by the numeral 30 and is designed to aspirate and dispense precise volumes of liquid into and from a tip (not shown) located at a lower end of an elongated hollow hand-holdable housing 32. The housing 32 includes a hollow upper end portion **32*a* which is shaped for gripping in one hand by an operator of the pipette with his or her thumb free to bear on a control knob 36 extending from the top 34*a* of a upwardly spring biased plunger 34. Thus arranged, a downward thumb force on the control knob 36 will move the plunger 34 against the force of the spring from an upper stop 40 to a lower stop (not shown) within the housing 32** to dispense liquid from the tip of the pipette.

The upper stop 40 is vertically adjustable within the housing 32 to control the volume of liquid which may be aspirated into and dispensed by the pipette 30. In this regard, a mid-portion **34*b* of the plunger 34 has a hexagonal cross section and is adapted to ride axially along a similarly shaped internal surface of a hollow volume screw or shaft 38 secured within the housing. The volume screw 38 includes an externally threaded lower end portion 38*a* mating in a threaded opening 42 of a cylinder 44. The cylinder 44 is secured inside the housing 32 and is adapted to receive a piston 46 fixed to the plunger 34 immediately below the mid-portion 34*b*. An upper end 38*b* of the volume screw 38 includes an internally threaded portion supporting an externally threaded cylindrical sleeve or plug 39 for receiving the upper portion 34*a* of the plunger 34. A bottom surface of the plug 39 defines the upper stop 40 for a top shoulder on the plunger mid-portion 34*b* and is vertically or axially moveable with the volume screw 38 upon a turning thereof. Such turning of the volume screw 38 is produced by a manual turning of a plunger 34 by the pipette operator gripping the control knob 36 between his or her thumb and forefinger and turning the control knob in a clockwise or counter clockwise direction. In one direction, a turning of the control knob 36 produces a downward movement of the volume screw 38 and hence the upper stop 40 while a turning in an opposite direction produces an upward movement of the volume screw 38 and upper stop 40. Upward movement of the upper stop increases the volume capacity of the pipette 30 by increasing the length of the upward stroke of the plunger to the upper stop. Conversely, a downward movement of the upper stop 40 decreases the volume capacity of the pipette. Such volume setting of the pipette 30 is displayed by a conventional micrometer counter 66 indicated diagrammatically in FIG. 5**.

As previously indicated, it is an important feature of the present invention that the volume setting of the pipette 30 may be locked in place to insure accurate repeatability of pipetting operations by the pipette. In this regard, the pipette 30 further includes a lock mechanism 48 including a lock knob 50. The lock knob 50 comprises a hollow screw or shaft 52 having an externally threaded body portion 54 for mating with an internally threaded portion 56 of a sleeve or retainer 58 secured to an inside of the housing 32. Within the housing 32, a lower end of the hollow screw 52 includes a downwardly and outwardly sloping annular cam surface 60 for engaging and mating with an upwardly and inwardly cam surface 64 of an annular collet 62 secured to an inside of the housing 32. The opening of the collet 62 is dimensioned to closely match the outer dimension of the volume screw 38. Thus, the collet 62 accommodates a turning of the volume screw 38 when the lock mechanism 48 is released and bears tightly on and essentially "grabs" the volume screw 38 when the lock mechanism 48 is engaged to thereby lock the volume setting for the pipette.

Figure 1:
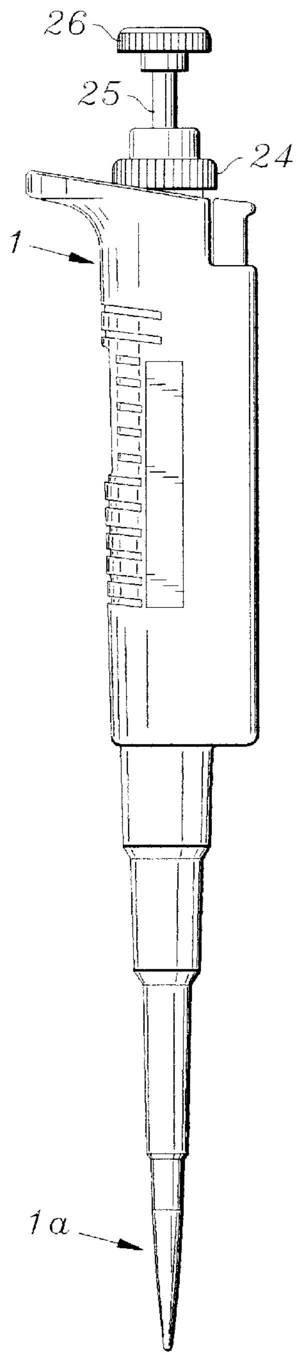
(PRIOR ART) FIG. 1
FIG. 1 is a side view of the Nichiryo pipette described in the U.S. Pat. No. 4,909,919.
Figure 2:
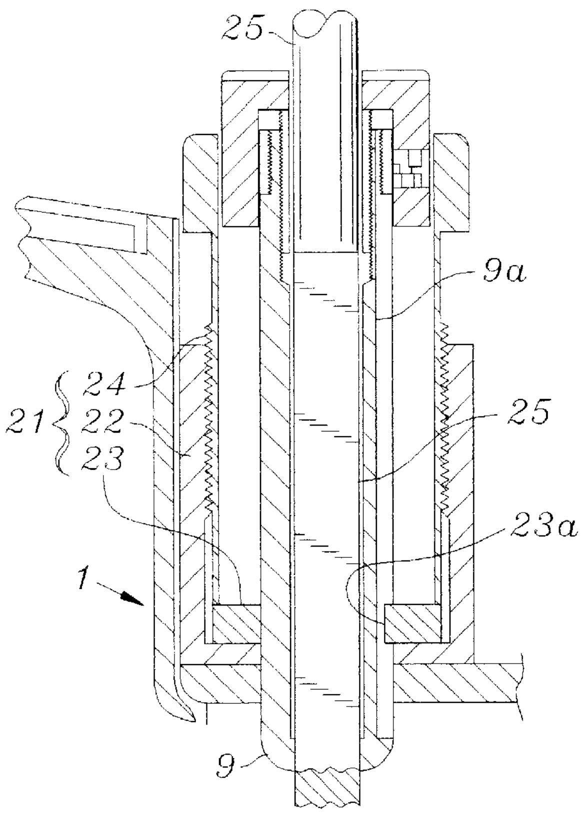
(PRIOR ART) FIG. 2
FIG. 2 is an enlarged fragmentary sectional view of the portion of the pipette of FIG. 1 which comprises the lock mechanism for the pipette plunger to set the adjustable volume of the pipette.
Figure 3:
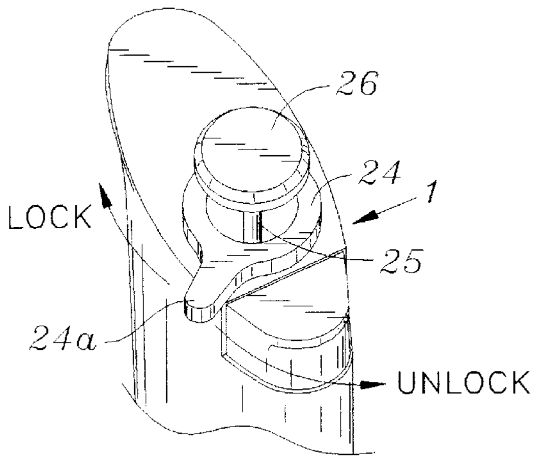
(PRIOR ART) FIG. 3
FIG. 3 is a fragmentary perspective view of an upper portion of a recently released Nichiryo pipette including a single wing extending from a volume adjustment lock knob for thumb actuation of the lock mechanism for the pipette.
Figure 4:
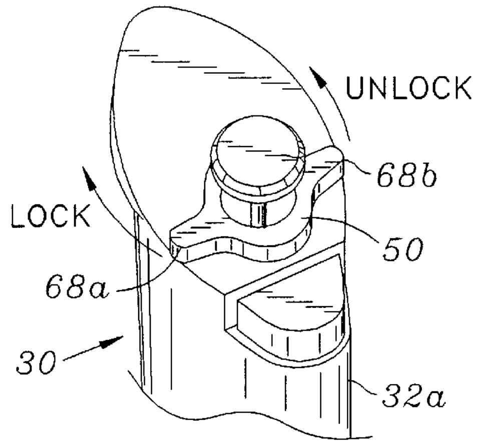
FIG. 4 is a fragmentary perspective view similar to FIG. 3 illustrating the two wing construction of an improved volume adjustment lock mechanism according to the present invention.

To aid in such actuation and release of the lock mechanism 48, the lock knob 50 includes an enlarged ring shaped knob portion 65 located just above the top of the housing 32 with a pair of outwardly extending diametrically opposed wings 68*a* and 68*b* extending from opposite sides of the knob 65. The wings 68*a* and 68*b* are adapted for thumb and/or finger engagement by the pipette operator when the operator grasps the upper end 32*a* of the housing 32. In this regard, as depicted diagrammatically in FIG. 4, an operator gripping the upper end portion 32*a* of the housing 32 presses with his or her thumb and/or finger on the wing(s) 68*a* and/or 68*b* to produce a clockwise turning of the lock knob 50. This produces an actuation of the lock mechanism 48 with a downward movement of the cam surface 60 against the cam surface 64 of the collet 62 causing the collet to lock against the outer surface of the volume screw 38. Such locking action prevents a turning of the volume screw and the plunger 32 to prevent any change in the volume setting for the pipette 30.

Conversely, when the operator desires to reset the volume capacity of the pipette 30, he or she simply releases the lock mechanism 48. To accomplish this, the operator simply presses with his or her thumb and/or finger on the wing(s) 68*b* and/or 68*a* to turn the wing and hence the lock knob 50 in a counter clockwise direction. Such turning of the lock knob 50 moves the cam surface 60 upward from the cam surface 64 of the collet thereby releasing the collet from the volume screw 38 this, in turn frees the volume screw 38 for turning to effect a volume adjustment by axial movement of the upper stop 40 in response to a turning of the plunger 34.

From the foregoing, it should be appreciated that the present invention provides a simple and highly effective mechanism for easily and quickly actuating and releasing a lock mechanism for the volume adjustment of the pipette 32 requiring only thumb and/or finger force to be exerted on a pair of diametrically opposed wings extending outwardly from a locking knob of the lock mechanism. Further, the lock mechanism comprises structure which tightly grips the outer surface of a volume screw to lock the screw in place eliminating any "play" in the setting of the lock mechanism to insure repeatable pipetting operations with the pipette. Still further, the pipette of the present invention allows its user to hold the pipette in one hand and with the same hand actuate and release the lock mechanism and reset the volume setting of the pipette leaving the other hand free for other tasks.

While a particular embodiment of such a lock mechanism has been illustrated and described in detail above, it is appreciated the changes and modifications may be made in the illustrated embodiment without departing from the spirit of the invention, the scope of which is to be limited only by the terms of the following claims.

I claim:

1. A volume adjustable pipette for aspirating and dispensing precise volumes of liquid comprising:

an elongated hollow hand-holdable housing;

a plunger supported for turning and for axial movement within the housing and including a thumb engageable upper end extending above a top of the housing;

an upper stop for the plunger axially adjustable within the housing in response to a turning of the plunger to adjust the volume of liquid drawn into a tip secured to a lower end of the housing upon upward axial movement of the plunger to engage the upper stop;

a manually actuated lock mechanism for locking the plunger against rotation to set the volume adjustment for the pipette comprising a hand-turnable knob for actuating and releasing the lock mechanism, and thumb and/or finger engageable wings extending outwardly from diametrically opposite sides of the hand-turnable knob for effecting an actuation of the lock mechanism upon a thumb and/or finger applied force on the wings for a turning of the knob in a first direction and for effecting a release of the lock mechanism upon a thumb and/or finger applied force on the wings for a turning of the knob in a second direction.

2. The pipette of claim 1 further comprising:

a hollow volume screw axially receiving the plunger for turning with the plunger within and relative to the housing upon a turning of the plunger and for axial movement relative to the hollow screw;

a gripping member extending from an inside of the housing to engage an outer surface of the volume screw, the gripping member comprising an annular collet engaging an outer surface of the volume screw and including an annular cam surface;

the hand-turnable knob carrying a sloping cam surface for engaging the annular cam surface of the collet to urge the collet against the outer surface of the volume screw to lock the volume screw relative to the housing upon a turning of the knob in a first direction; and the upper stop being secured to the volume screw to engage a shoulder on the plunger to limit upper axial movement of the plunger within the housing.

3. A volume adjustable pipette for aspirating and dispensing precise volumes of liquid comprising:

an elongated hollow hand-holdable housing;

a plunger supported for turning and for axial movement within the housing and including a thumb engageable upper end extending above a top of the housing;

an upper stop for the plunger axially adjustable within the housing in response to a turning of the plunger to adjust the volume of liquid drawn into a tip secured to a lower end of the housing upon upward axial movement of the plunger to the upper stop;

a manually actuated lock mechanism for locking the plunger against rotation to set the volume adjustment for the pipette comprising a hand-turnable knob for actuating and releasing the lock mechanism;

a hollow volume screw axially receiving the plunger for turning with the plunger within and relative to the housing and for axial movement relative to the plunger;

a gripping member extending from an inside of the housing to engage an outer surface of the volume screw, the gripping member comprising a annular collet engaging an outer surface of the volume screw and including an outer cam surface;

the hand-turnable knob carrying a cam surface for engaging the annular cam surface of the collet to urge the collet against the volume screw to lock the volume screw relative to the housing upon an annular turning of the hand-turnable knob in a first direction; and the upper stop being secured within the volume screw to engage a shoulder on the plunger to limit upper axial movement of the plunger within the housing.

4. In a volume adjustable pipette for aspirating and dispensing precise volumes of liquid, the pipette comprising an elongated hollow hand-holdable housing, a plunger supported for turning and for axial movement within the housing and including a thumb engageable upper end extending above a top of the housing, an upper stop for the plunger axially adjustable within the housing in response to a turning of the plunger to adjust the volume of liquid which may be drawn into a tip secured to a lower end of the housing upon upward axial movement of the plunger to the upper stop and a manually actuated lock mechanism for locking the plunger against rotation to set the volume adjustment for the pipette and comprising a hand-turnable knob for actuating and releasing the lock mechanism, the improvement comprising:

two thumb and/or finger engageable wings extending outwardly from diametrically opposite sides of the hand-turnable knob for effecting actuation of the lock mechanism upon a thumb and/or finger application of force on the wings for a turning of the knob in a first direction and for effecting a release of the lock mechanism upon a thumb and/or finger application of force on the wings for a turning of the knob in a second direction.

* * * * *